United States Patent [19]
Oohashi et al.

[11] Patent Number: 5,316,227
[45] Date of Patent: May 31, 1994

[54] SHAPING APPARATUS FOR FORMING A FIELD COIL

[75] Inventors: Yasushi Oohashi, Kariya; Mithuyuki Hayashi, Nishio; Masahiko Sakai, Takahama, all of Japan

[73] Assignee: Nippondenso Co., Ltd., Kariya, Japan

[21] Appl. No.: 750,087

[22] Filed: Aug. 27, 1991

[30] Foreign Application Priority Data

May 10, 1991 [JP] Japan ................. 3-106082
Aug. 27, 1991 [JP] Japan ................. 2-225994

[51] Int. Cl.⁵ .......................... H02K 15/06
[52] U.S. Cl. .......................... 242/7.03; 29/596; 29/736; 140/92.2; 242/1.1 R
[58] Field of Search ........... 242/7.02, 7.04, 7.06, 242/7.07, 7.11, 7.13, 7.14, 1.1 F, 1.1 R, 7.03; 29/605, 596, 736; 140/92.2

[56] References Cited

U.S. PATENT DOCUMENTS 4,449,289 5/1984 Kindig ................. 29/736
4,946,112 8/1990 Nelle et al. ............ 242/7.14
4,969,606 11/1990 Santandrea et al. ...... 242/61 R
5,235,738 8/1993 Eminger ................ 29/596 X

FOREIGN PATENT DOCUMENTS 54-99901 8/1979 Japan .

Primary Examiner—Andrew M. Falik
Attorney, Agent, or Firm—Cushman, Darby & Cushman

[57] ABSTRACT

An apparatus for forming a field coil with a low load comprises a rotary table, a reel table to be turned together with the rotary table, six reel bars for guiding and winding a conductor into the coil according to the rotation of the rotary table, and six shaping units disposed alternately with the reel bars. The shaping units are radially movable on the rotary table. A groove-cam-type moving mechanism radially reciprocates, at a rate of one reciprocation per turn of the rotary table, the shaping units on the rotary table with predetermined phase shifts between the movements of the shaping units, thereby pushing the conductor stretched between the reel bars toward the center of the rotary table and shaping the conductor.

8 Claims, 22 Drawing Sheets

SHAPING APPARATUS FOR FORMING A FIELD COIL

BACKGROUND OF THE INVENTION

1. Field of the Invention

The present invention relates to an apparatus for forming a field coil used for a rotary electric machine.

2. Description of the Related Art

An apparatus for winding and forming a field coil is disclosed in, for example, Japanese Unexamined Patent Publication No. 54-99901.

FIG. 19 shows this kind of apparatus. In the figure, a rotary table 1 has a plurality of reels 2 that are radially movable on the rotary table 1. In FIG. 20, grooves 3 radially extend on the rotary table 1, to receive the reels 2, respectively. Each of the reels 2 has a back member 4 arranged on the back of the rotary table 1 and a connection member 5 passing through the groove 3, so that the reel 2 may move along the groove 3.

A rotary shaft (not shown) of the rotary table 1 rotatably supports a cam 6, which has arc grooves 7 as shown in FIG. 21. Each of the arc grooves receives a cam follower 8 fitted to the back member 4.

When the rotary table 1 is turned, a conductor is wound several times into a coil C1 having a hexagonal shape as shown in FIG. 22. Thereafter, shaping members 10 are pushed radially inwardly by hydraulic cylinders and the cam 6 is turned to move the cam followers 8, thereby pressing the coil C1 and forming a corrugated shape of the coil as shown in FIG. 24. When the coil is inwardly pressed by the shaping members 10, the cam 6 turns to inwardly move the reels 2 in synchronism with the shaping members 10 to form the coil. After the completion of the inward movement of the reels 2, tension springs (not shown) outwardly pull the reels 2. The shaped coil is removed and fitted to a stator core as shown in FIG. 25.

According to this conventional apparatus, the reels 2 must be moved in synchronism with the shaping members 10. This complicates the structure of the apparatus. In addition, shaping the conductor 9 after winding it several times requires a heavy load or large force to be applied to the wound conductor 9. In addition and to withstand the heavy load, large and sturdy rigid jigs must be used. This may increase the size of the apparatus and, hence, the facilities which hold such apparatus.

SUMMARY OF THE INVENTION

An object of the invention is to provide a field coil forming apparatus which is simple in construction and does not require a heavy forming load or a large amount of force to form a field coil.

According to a first aspect of the invention, there is provided a field coil forming apparatus comprising a rotary base to be driven and rotated, a plurality of winding guides for guiding and winding a conductor into a field coil according to the rotation of the rotary base, a plurality of movable shaping members disposed alternately with the winding guides and radially movable on the rotary base, and a moving mechanism for radially reciprocating, at a rate of one reciprocation per turn of the rotary base, the movable shaping members on the rotary base between the winding guides so that the conductor is extended between the winding guides and pushed toward the center of the rotary base and shaped.

According to a second aspect of the invention, each of the movable shaping members of the first aspect of the invention is guided along a groove radially extending on the rotary base, the moving mechanism utilizes a fixed cam having a groove, and cam followers protrude from the movable shaping members and engage the groove of the fixed cam. When the rotary base is turned, the cam followers are guided along the groove of the fixed cam, to thereby move the shaping members.

According to a third aspect of the invention, each of the movable shaping members of the first aspect of the invention has a shaping element for pushing the conductor extending between the winding guides toward the center of the rotary base and shaping the conductor. Each shaping element is movable between a position for pushing the conductor toward the center of the rotary base and a position which does not interfere with the stretched conductor, so that, after pushing the conductor toward the center of the rotary base, the shaping element returns to an original position while keeping its non-interfering position.

According to a fourth aspect of the invention, each of the shaping elements of the third aspect of the invention is moved by a cam in synchronism with the reciprocation corresponding to one of the movable shaping members.

In the first aspect of the invention, the winding guides guide and wind the conductor according to the rotation of the rotary base. At the same time, the moving mechanism radially reciprocates, at a rate of one reciprocation per turn of the rotary base, the movable shaping members on the rotary base between the winding guides, thereby pushing the conductor between the winding guides toward the center of the rotary base and shaping the conductor. That is, the conductor is wound and shaped at every turn of the rotary base.

In the second aspect of the invention, the cam followers are guided along the groove of the fixed cam according to the rotation of the rotary base, to move the movable shaping members along the radial grooves on the rotary base.

In the third aspect of the invention, each of the shaping elements of the movable shaping members pushes the conductor toward the center of the rotary base and then returns to the original position while keeping a position which does not interfere with the conductor. That is, after pushing the conductor, each shaping element avoids the conductor stretched between the winding guides. As a result, the conductor does not have to be moved to avoid the shaping elements, so that the conductor may be wound and shaped at high speed without being twisted.

In the fourth aspect of the invention, in addition to the third aspect, each shaping element is moved by the cam in synchronism with the reciprocation of the corresponding movable shaping member.

DESCRIPTION OF THE PREFERRED EMBODIMENTS

An embodiment of the invention will be explained with reference to the drawings.

Figure 1:
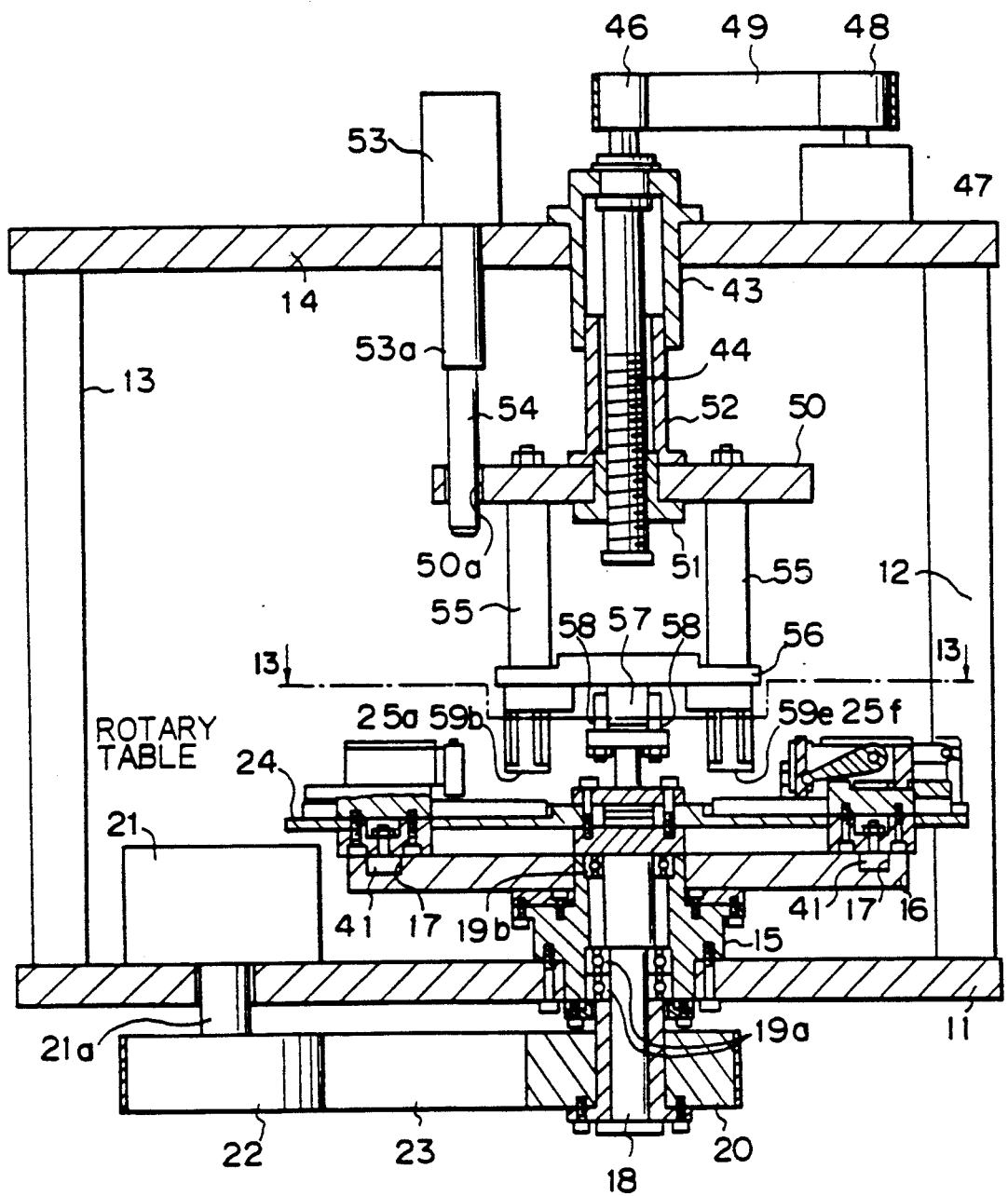
FIG. 1 is a sectional view showing an apparatus for forming a field coil according to an embodiment of the invention.

In FIG. 1, a lower frame 11 has upright supports 12 and 13. An upper frame 14 is fixed to the top ends of the supports 12 and 13. A housing 15 is fixed to the lower frame 11. A disk-like fixed cam 16 is fixed to an upper part of the housing 15.

A groove 17 is formed on the fixed cam 16. The groove 17 is substantially annular and divided into four zones Z1 to Z4. The zone Z1 is a holding zone which extends for approximately 200 degrees with an equal radius, a rotation center. The zone Z3 is a releasing zone extending for about 30 degrees with a larger radius than the holding zone Z1. The zone Z2 is a shaping zone extending for about 65 degrees for connecting the holding zone Z1 with the releasing zone Z3. The zone Z4 is a returning zone extending for about 65 degrees for connecting the releasing zone Z3 with the holding zone Z1.

In FIG. 1, a main shaft 18 is rotatable through bearings 19a and 19b in the housing 15. A lower end of the main shaft 18 protrudes from the bottom of the lower frame 11. A pulley 20 is fixed to the lower end of the main shaft 18. A motor 21 is fixed to the lower frame 11, and a rotary shaft 21a of the motor 21 protruding from the bottom of the lower frame 11 is fixed to a pulley 22. Torque of the rotary shaft 21a of the motor 21 is transmitted to the main shaft 18 through the pulley 22, belt 23, and pulley 20.

An upper end of the main shaft 18 passes through the fixed cam 16 and is fixed to a rotary table 24 serving as the rotary base. The main shaft 18 and rotary table 24 are turned together.

Figure 3:
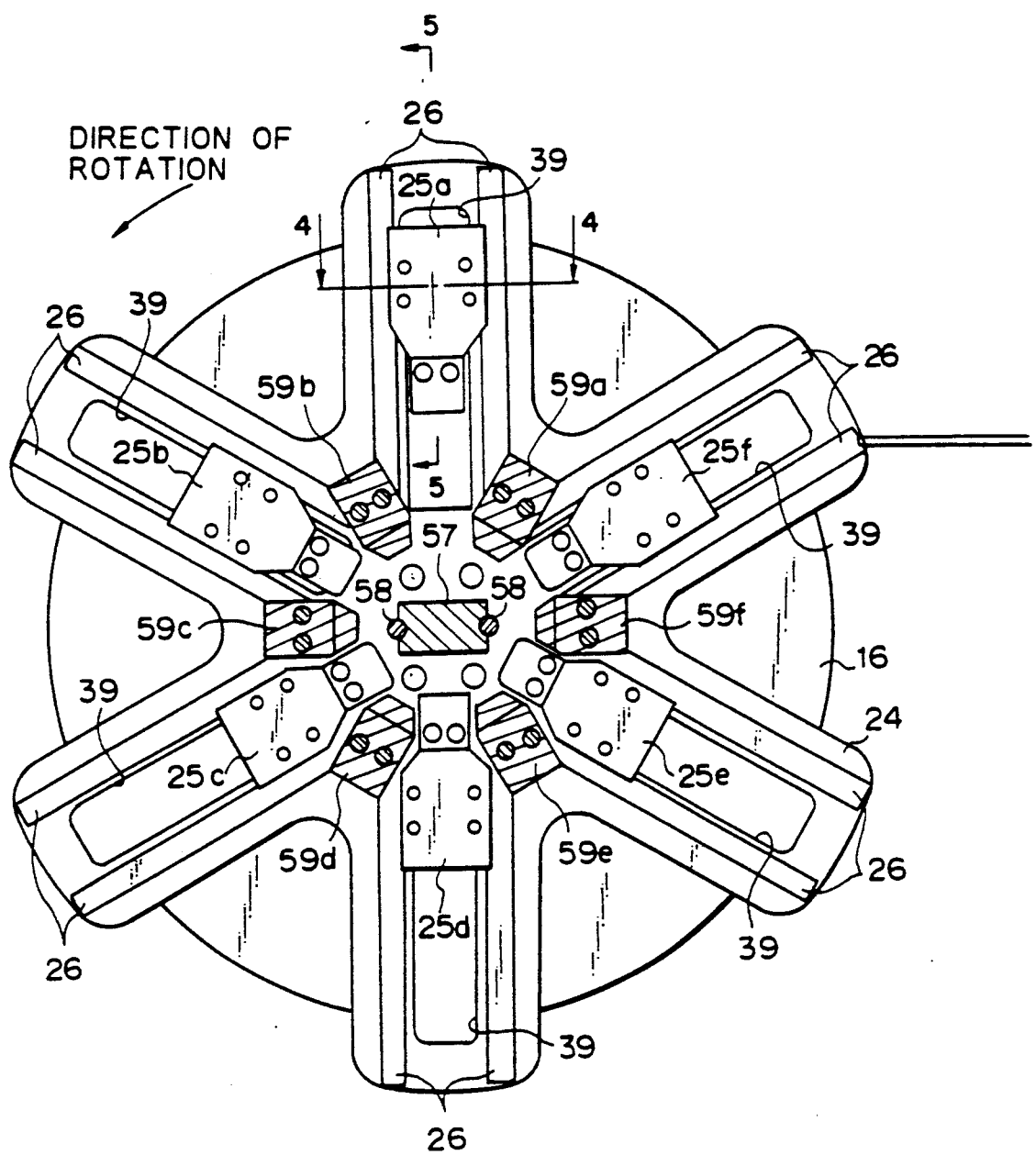
FIG. 3 is a sectional view taken along a line 3—3 of FIG. 1.

FIG. 3 is a sectional view taken along a line 3—3 of FIG. 1. In FIG. 3, mix shaping units 25a to 25f serving as the movable shaping members are disposed on the rotary table 24. The shaping units 25a to 25f are radially movable on the rotary table 24.

Figure 4:
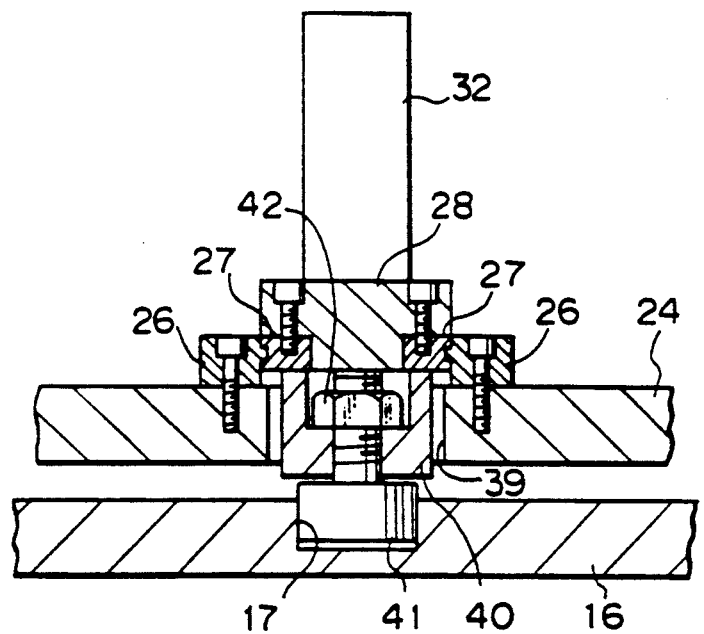
FIG. 4 is a sectional view taken along a line 4—4 of FIG. 3.

The shaping units 25a to 25f will be explained with reference to FIGS. 4 and 5, in which FIG. 4 is a sectional view taken along a line 4—4 of FIG. 3, and FIG. 5 a sectional view taken along a line 5—5 of FIG. 3.

In FIG. 4, the rotary table 24 has grooves 39. Rails 26 are fixed along the grooves 39. As shown in FIG. 3, the rails 26 radially extend from the rotary center of the rotary table 24 and are arranged at equal intervals of 60 degrees. Linear bearings 27 are fitted to and movable along the rails 26. A base 28 of each of the shaping units 25a to 25f is fixed to the linear bearings 27 so that the base may radially move on the rotary table 24.

Figure 5:
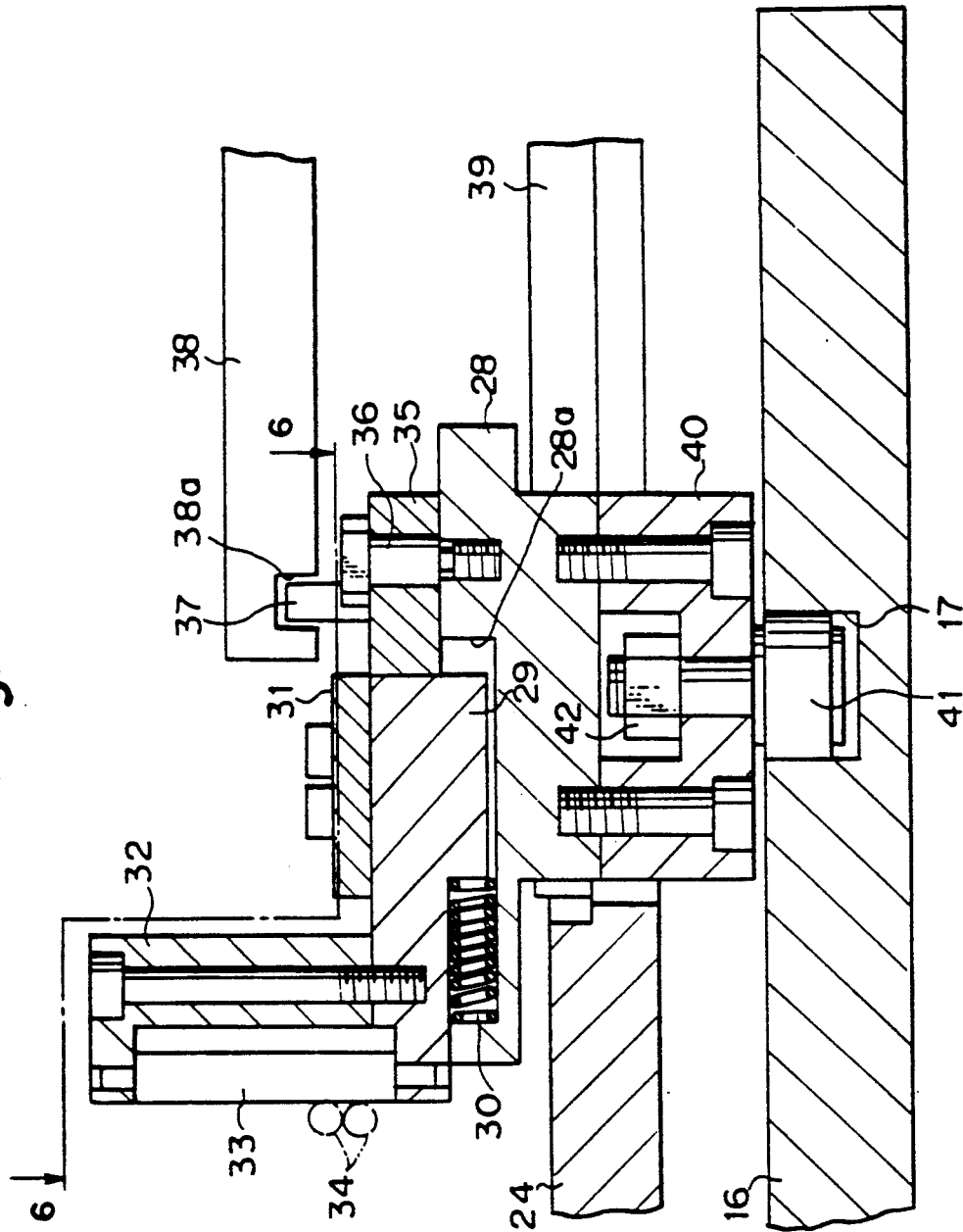
FIG. 5 is a sectional view taken along a line 5—5 of FIG. 3.

In FIG. 5, an upper face of the base 28 of each of the shaping units 25a to 25f has a radially extending recess 28a. The recess 28a receives the bottom of a slider 29. The slider 29 is always pushed radially outward by a spring 30.

A cover 31 is fixed to the top of the base 28. The cover 31 prevents the slider 29 from rising due to a load produced when the slider 29 moves along the rails 26. A holder 32 is fixed on the slider 29. Thin shaping rollers 33 are rotatably supported between an upper end of the holder 32 and the slider 29. The shaping rollers 33 push and shape a conductor 34.

Figure 6:
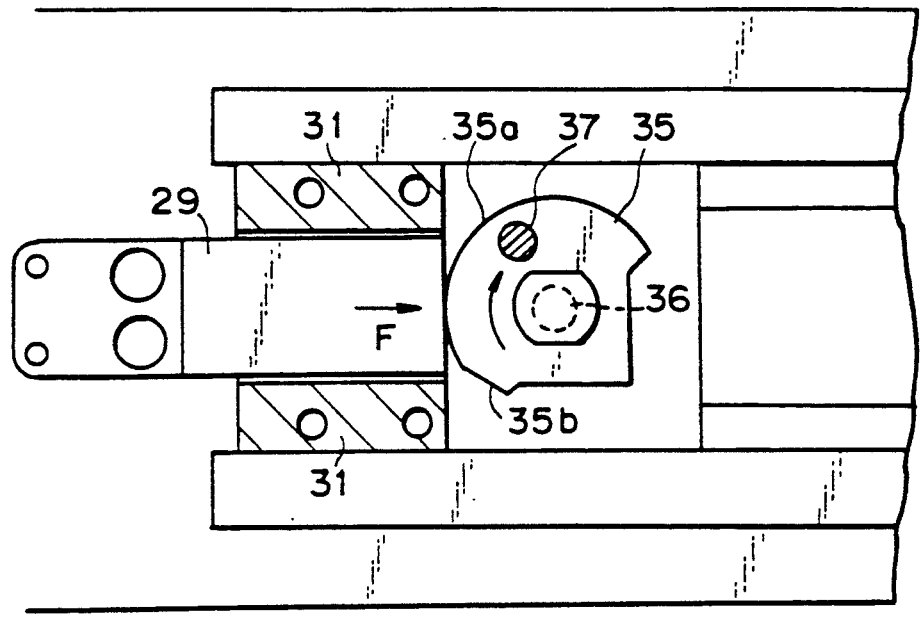
FIG. 6 is a sectional view taken along a line 6—6 of FIG. 5.

A cam 35 is rotatably fitted on the base 28 with a screw pin 36. As shown in FIG. 6 which is a cross sectional view taken along a line 6—6 of FIG. 5, the cam 35 has a first peripheral face 35a having an equal radius throughout and a second linear peripheral face 35b. A pin 37 protrudes from the cam 35 to transmit torque. An end of a hook 38 driven by a cylinder (not shown) is positioned above the cam 35 and provided with a groove 38a for receiving the pin 37 of the cam 35. A movement of the hook 38 is transferred to the cam 35 through the pin 37, to turn the cam 35 around the screw pin 36.

Figure 7:
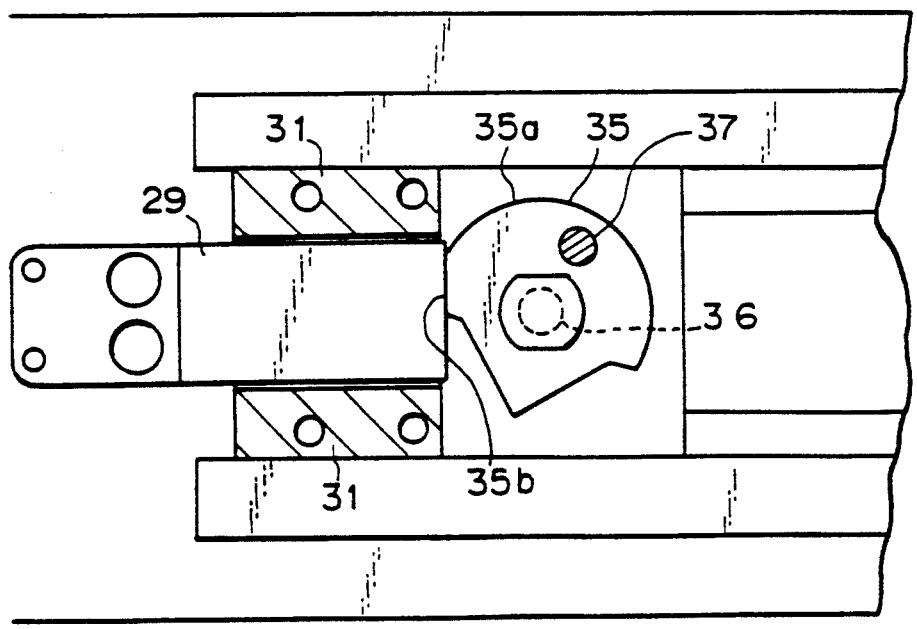
FIG. 7 is a sectional view explaining an operation of the embodiment.

As shown in FIG. 6, a force F of the spring 30 continuously pushes the slider 29 against the periphery of the cam 35. When the cam 35 is turned so that the second peripheral face 35b, after the first peripheral face 35a, makes contact with the slider 29, the slider 29 is outwardly moved slightly as shown in FIG. 7.

In FIGS. 4 and 5, a cam follower stay 40 is fixed to the bottom of the base 28 of each of the shaping units 25a to 25f, and inserted into the groove 39 of the rotary table 24. A cam follower 41 is fixed to the cam follower stay 40 with a nut 42. The cam follower 41 engages with the groove 17 of the fixed cam 16, and when the rotary table 24 is turned by the motor 21, the cam follower 41 is guided along the groove 17 of the fixed cam 16, to thereby radially reciprocate sequentially the shaping units 25a to 25f on the rotary table 24.

In FIG. 1, a covered cylindrical guide 43 is fixed to the upper frame 14 above the housing 15. The guide 43 rotatably supports a threaded shaft 44. A pulley 46 is fitted to an upper end of the threaded shaft 44, so that torque of a motor 47 fixed to the upper frame 14 is transmitted to the threaded shaft 44 through a pulley 48, a belt 49, and the pulley 46.

A left-hand male thread is formed on a lower periphery of the threaded shaft 44 and engaged with a left-hand female thread formed on a threaded flange 51 fixed to a plate 50. When the threaded shaft 44 is turned by the motor 47, the plate 50 and threaded flange 51 are upwardly or downwardly moved. A cylindrical flange 52 surrounding the lower part of the threaded shaft 44 is fixed to the plate 50 and slidably inserted into the guide 43.

A cylinder 53 is fixed to the upper frame 14 beside the guide 43. The cylinder 53 has a cylinder rod 53a protruding downward from the upper frame 14. A rotation-stop pin 54 is fixed to a lower end of the cylinder rod 53a. When the rod 53a of the cylinder 53 extends downwardly, the rotation-stop pin 54 enters a positioning hole 50a of the plate 50, thereby stopping the rotation of the plate 50. If the threaded shaft 44 is turned by the motor 47 at this moment, the plate 50 descends or ascends.

A reel table 56 is fitted under the plate 50 with poles 55, to face the rotary table 24. A positioning guide 57 is fixed to the center of a lower face of the reel table 56. Corresponding to the positioning guide 57, positioning pins 58 are fixed to the center of the rotary table 24. In FIG. 3, when the reel table 56 descends, the positioning guide 57 engages with the positioning pins 58 of the rotary table 24, so that torque of the rotary table 24 is transmitted to the reel table 56 and plate 50, and the reel table 56 and rotary table 24 turn in synchronism.

Six reel bars 59a to 59f serving as the winding guides are fixed to the bottom of the reel table 56 as shown in FIG. 3. The reel bars 59a to 59f are arranged on a concentric circle around the center of the rotary table 24 at equal intervals of 60 degrees. The shaping units 25a to 25f are located at intermediate positions between the adjacent reel bars (59a and 59b, 59b and 59c, 59c and 59d, 59d and 59e, 59e and 59f, and 59f and 59a), respectively.

Next, the operation of the field coil forming apparatus having the above arrangement will be explained.

In FIG. 1, the rod 53a of the cylinder 53 is lowered to insert the rotation-stop pin 54 into the positioning hole 50a of the plate 50. The motor 47 is driven to transmit torque to the threaded shaft 44, and according to the rotation of the threaded shaft 44, the reel table 56 is lowered so that the positioning guide 57 may engage with the positioning pins 58. Thereafter, the motor 47 is stopped.

Figure 8:
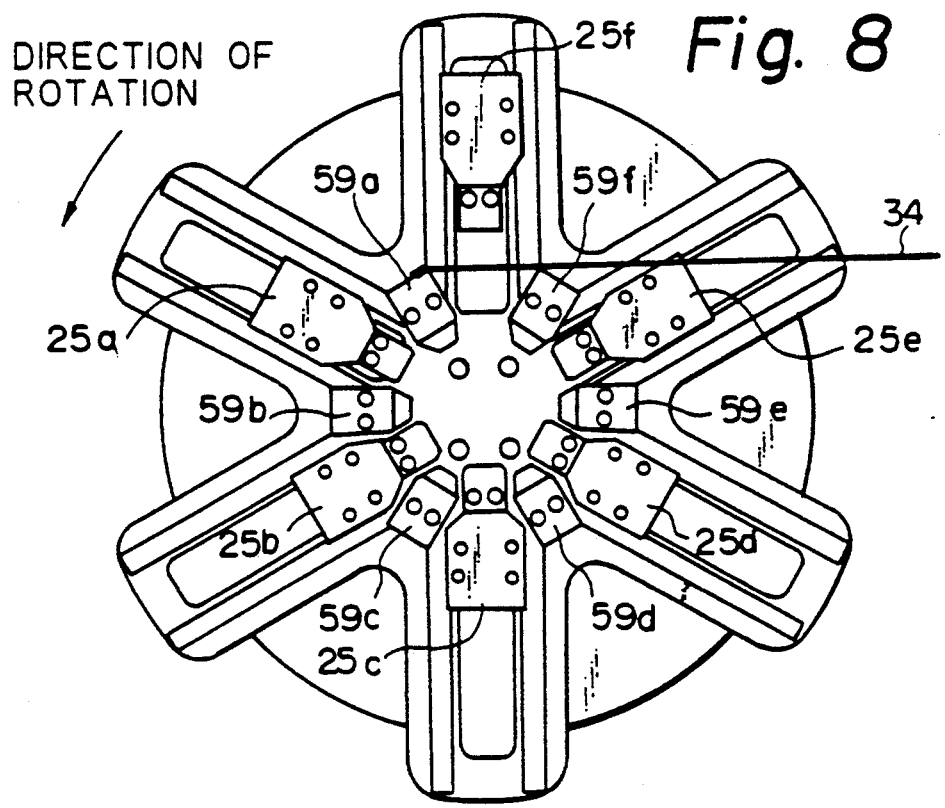
FIGS. 8 to 10 are front views explaining operations of a rotary table of the embodiment.

In FIG. 8, the reel bar 59a holds the conductor 34, and the cylinder 53 is operated to pull the rotation-stop pin 54 out of the positioning hole 50a of the plate 50. Conductor 34 may be supplied by any source, such as a conductor-supplying pack, a conductor spool, or the like. The motor 21 is started to turn the rotary table 24 in a counterclockwise direction in FIG. 8, to start winding the conductor 34. At this time, the shaping unit 25f guided by the cam follower 41 is located farthest from the rotation center because it is in the releasing zone Z3 of the cam groove 17 shown in FIG. 2.

Figure 2:
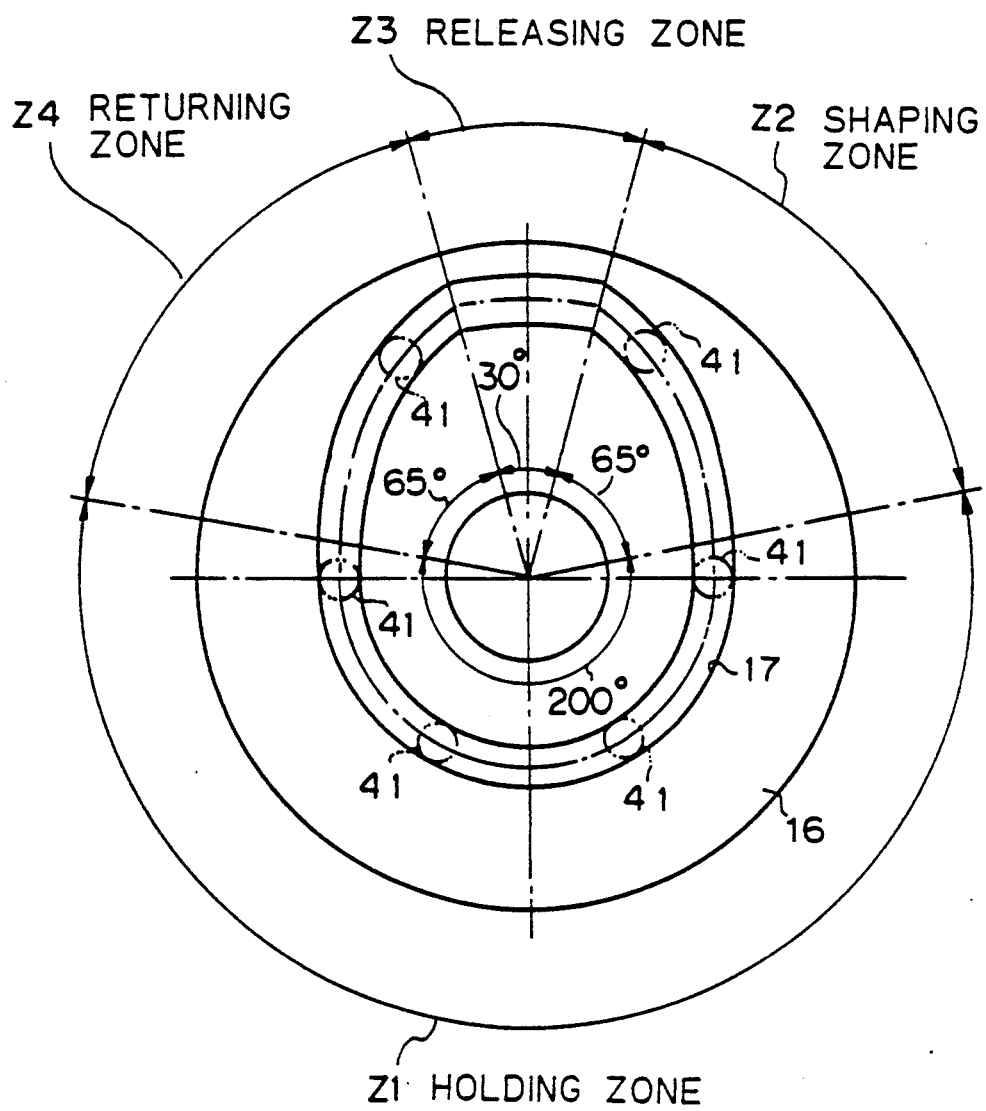
FIG. 2 is a front view showing a fixed cam of the embodiment.

As the rotary table 24 continues to rotate, the shaping unit 25f on the rotary table 24 moves from the releasing zone Z3 to the shaping zone Z2 of the cam groove 17 shown in FIG. 2. The cam follower 41 fitted to the bottom of the shaping unit 25f is guided along the cam groove 17 toward the center of the rotary table 24, and accordingly, the shaping unit 25f moves toward the rotation center.

Figure 9:
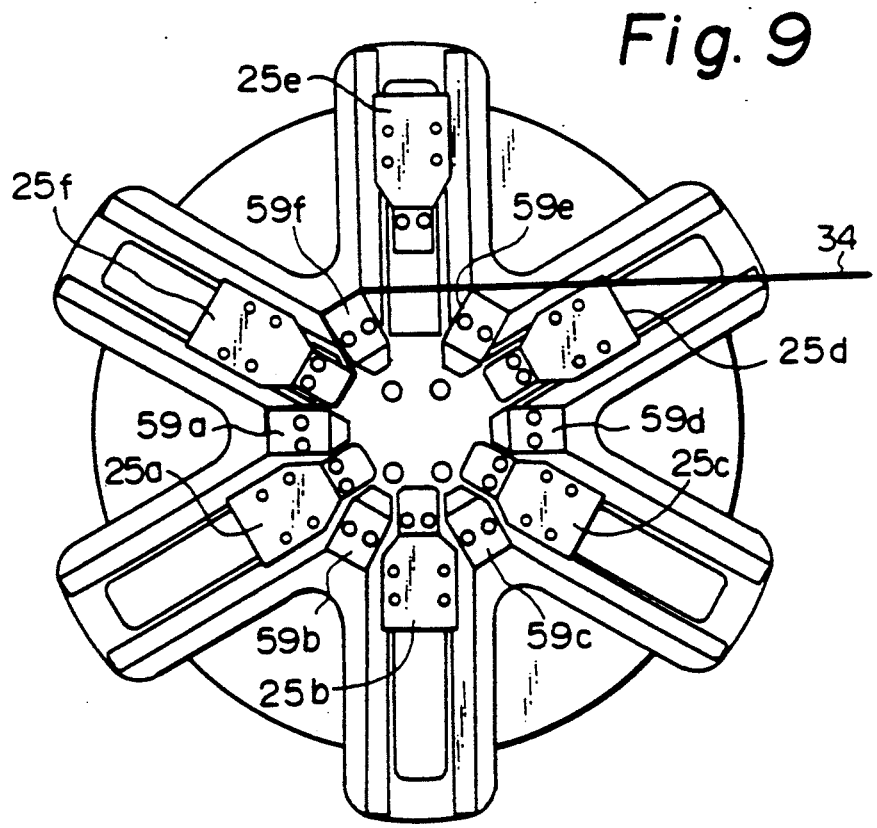

The conductor 34, wound around the reel bars 59a and 59f due to the rotation of the rotary table 24, is corrugated by a force exerted by the shaping unit 25f moving toward the center of the rotary table 24, as shown in FIG. 9.

The shaping unit 25f, shaping the conductor 34, shaping the conductor 34 holds the corrugated shape of the conductor 34. The shaping unit 25f on the rotary table 24 then moves into the holding zone Z1 of the cam groove 17 shown in FIG. 2. In the holding zone Z1, the cam groove 17 is equally distanced from the center of the rotary table 24, so that the shaping unit 25f continues to hold the conductor 34 at the minimum radius.

Figure 10:
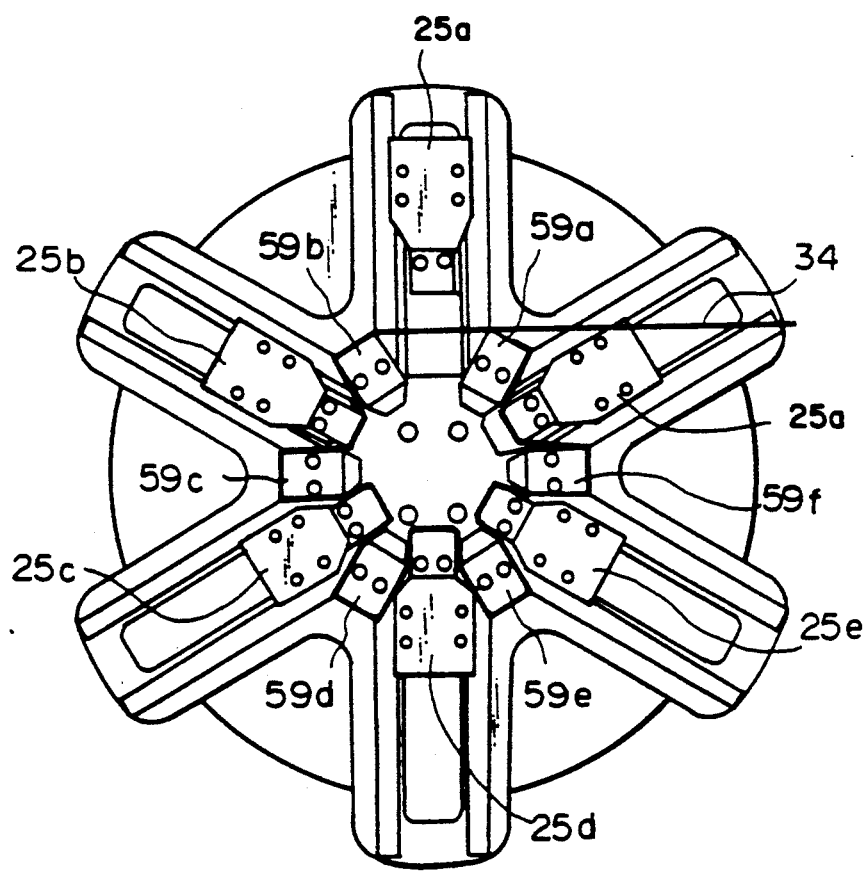

When the rotary table 24 further turns, the shaping unit 25f on the rotary table 24 moves into the returning zone Z4 shown in FIG. 2. At this time, the cam follower 41 on the lower face of the shaping unit 25f moves along the cam groove 17 toward the periphery of the rotary table 24, so that the shaping unit 25f also moves outwardly to free the conductor 34, as shown in FIG. 10.

When the rotary table 24 starts a second turn, the shaping unit 25f on the rotary table 24 returns to the releasing zone Z3 of the cam groove 17 shown in FIG. 2, and the shaping unit 25f comes to the outermost position.

The reel bar 59a winds the conductor 34 for the second time, and the second winding of the conductor 34 is shaped as in the first winding.

Similar to the shaping unit 25f explained above, the other shaping units 25a to 25e alternating with the reel bars 59a to 59f form the corrugated coil in the same manner.

Since the threaded flange 51 and threaded shaft 44 mesh with each other, the plate 50 is lowered for one pitch of the thread for one turn of the rotary table 24. The conductor 34, therefore, is wound while the reel bars 59a to 59f are being lowered.

After the predetermined number of windings of the conductor 34 is made, the hooks 38 shown in FIG. 5 are activated by the cylinders to hook the pins 37 on the cams 35 of the shaping units 25c, 25d, and 25e, thereby turning the cams 35. As a result, in each of these shaping units 25c, 25d, and 25e, the second peripheral face 35b of the cam 35 gets in contact with the end face of the slider 29, and the slider 29 and thus the shaping rollers 33 on the slider 29 are radially and outwardly moved by the spring 30.

Since the shaping rollers 33 of the shaping units 25c, 25d, and 25e that have been holding the wound coil are outwardly moved, the coil is freed. The rod 53a of the cylinder 53 is then lowered to insert the rotation-stop pin 54 into the positioning hole 50a of the plate 50, to stop the rotation of the plate 50.

Thereafter, the motor 47 is driven to turn the threaded shaft 44, thereby lifting the plate 50, freed coil, and reel table 56.

Figure 24:
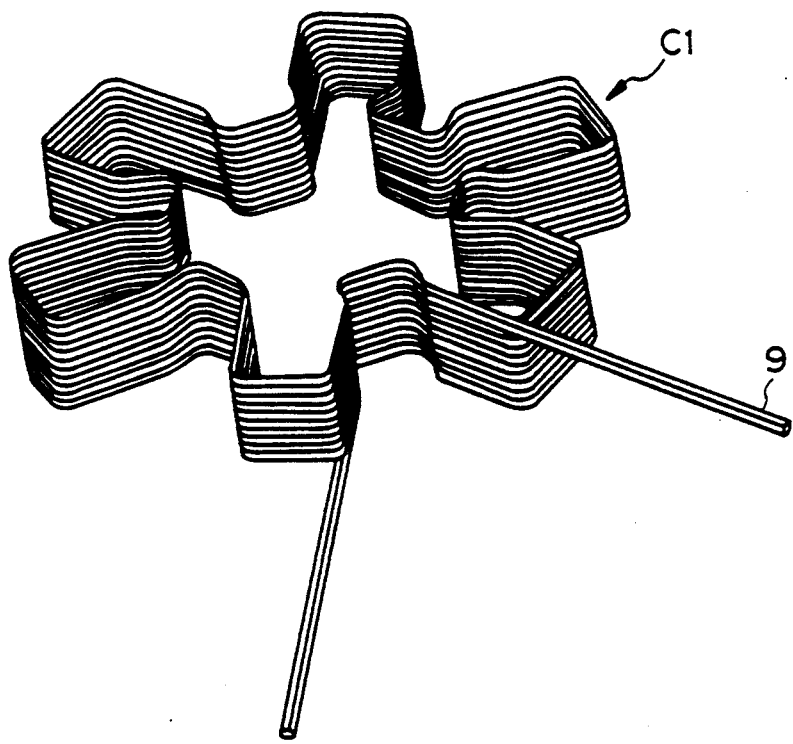
FIG. 24 is a perspective view showing a field coil formed into a corrugated shape according to the prior art.
Figure 25:
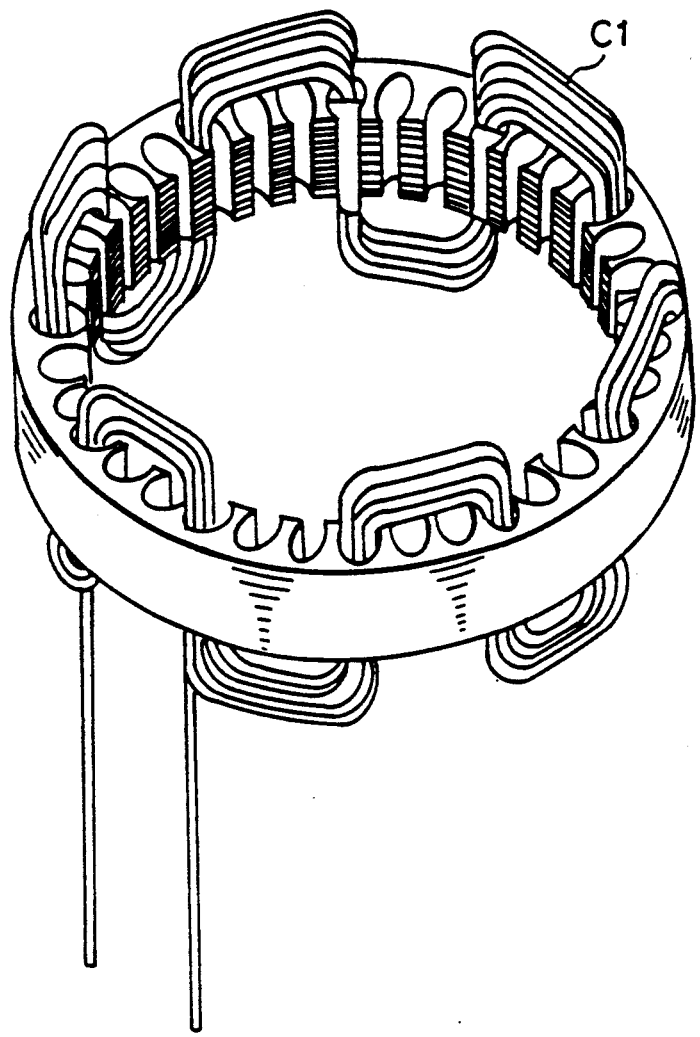
FIG. 25 is a perspective view showing a corrugated coil fitted to a core according to the prior art.

The wound corrugated coil is removed from the reel bars 59a to 59f as shown in FIG. 24, mounted on a coil insertion jig, and inserted into a stator core as shown in FIG. 25.

In this way, according to this embodiment, the rotary table (rotary base) 24 and the reel table 56 are turned together. According to the rotation of the rotary table 24, the six reel bars (winding guides) 59a to 59f guide and wind the conductor 34. The six shaping units (movable shaping members) 25a to 25f are alternately arranged with the reel bars 59a to 59f and supported to be radially movable on the rotary table 24. The groove-cam-type moving mechanism radially reciprocates, at a rate of one reciprocation per turn of the rotary table 24, the shaping units 25a to 25f on the rotary table 24 with predetermined shifts between the movements of the shaping units 25a to 25f, so that the conductor 34 stretched between the reel bars 59a and 59f is pushed toward the center of the rotary table 24 and shaped.

In this way, the reel bars 59a to 59f are not radially moved, and the rotary table 24 is turned to guide the cam followers 41 fitted to the bottom of the shaping units 25a to 25f along the groove 17 of the fixed cam 16, to thereby radially move the cam followers 41 and shaping units 25a to 25f on the rotary table 24 and shape the conductor 34 into a coil by winding.

The reel bars 59a to 59f and the shaping units 25a to 25f each achieve a single function to simplify the structure of the apparatus. Since the conductor 34 is formed into a coil by the above-described winding, the apparatus coil forming load required is small and a compact jig can be used. As a result facilities required can be prepared in a short time and mode smaller while, changes in products and preparation of new products can be made in a short time at low costs.

The invention is not limited to the above embodiment that employs the fixed groove cam as the driving mechanism for the shaping units. For example, the shaping units may be provided with ball screws whose shafts are turned by a motor, etc., to radially move the shaping units on the rotary table. In this way, the groove cam may be replaced with another driving mechanism.

As explained above, the invention provides a field coil forming apparatus having a simple structure for forming a field coil with a light load.

Figure 11:
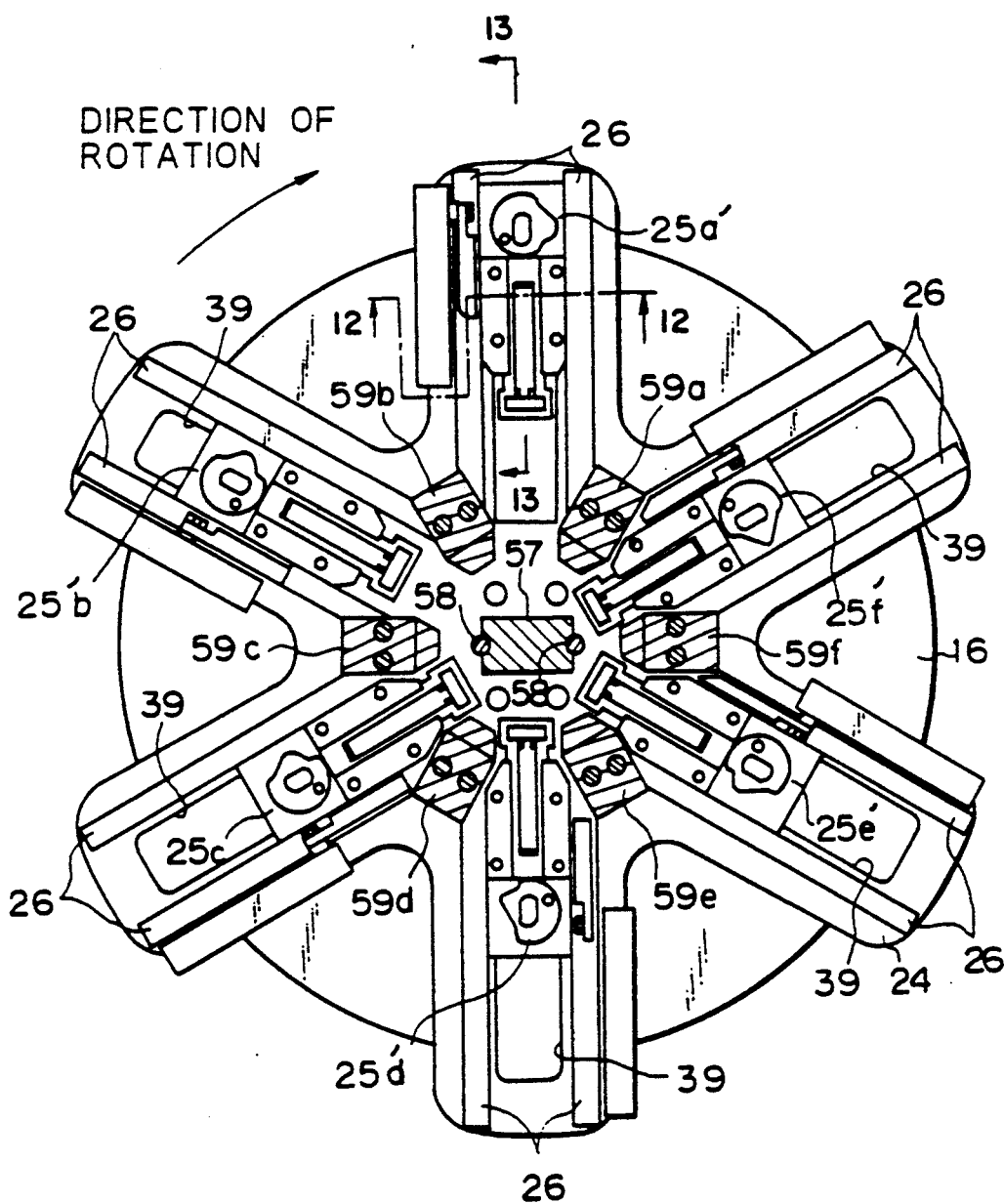
FIG. 11 is a sectional view taken along a line 3—3 of FIG. 1, showing another embodiment of the invention.

Another embodiment of the invention will be explained. FIG. 11 is another sectional view taken along the line 3—3 of FIG. 1, showing shaping units 25a' to 25f', FIG. 12 is a sectional view taken along a line 12—12 of FIG. 11, FIG. 13 is a sectional view taken along a line 13—13 of FIG. 11, and FIG. 14 is a sectional view taken along a line 14—14 of FIG. 13.

In FIG. 11, the six shaping units 25a' to 25f' serving as the movable shaping members are disposed on a rotary table 24. These shaping units are radially movable on the rotary table 24.

Figure 12:
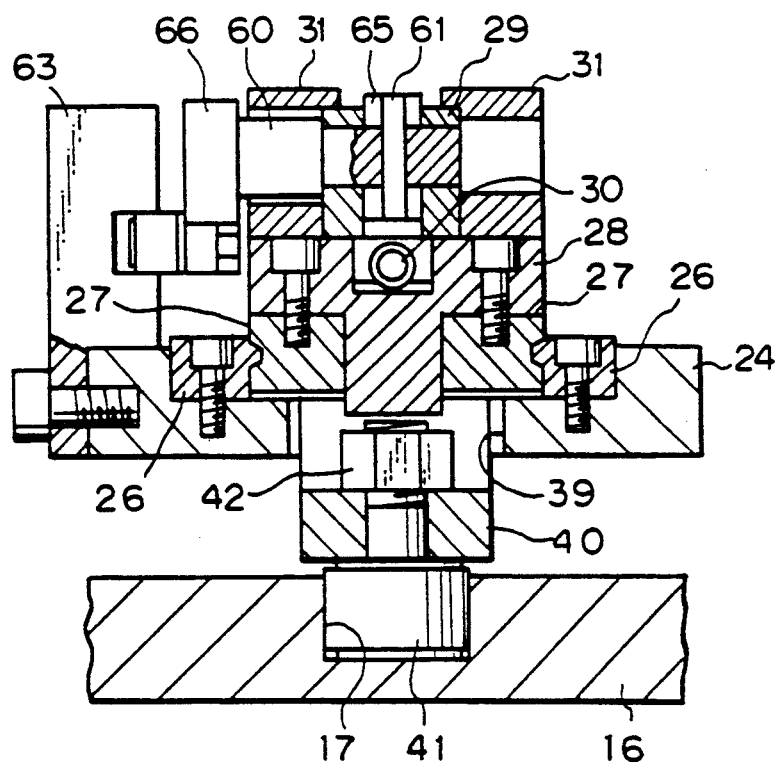
FIG. 12 is a sectional view taken along a line 12—12 of FIG. 11.

In FIG. 12, the rotary table 24 has grooves 39. Rails 26 are fixed along the grooves 39. As shown in FIG. 11, the rails 26 radially extend from the rotary center of the rotary table 24 and arranged at equal intervals of 60 degrees. Linear bearings 27 are fitted to and movable along the rails 26. A base 28 of each of the shaping units 25a' to 25f' is fixed to the linear bearings 27 so that the base 28 may radially move on the rotary table 24.

Figure 13:
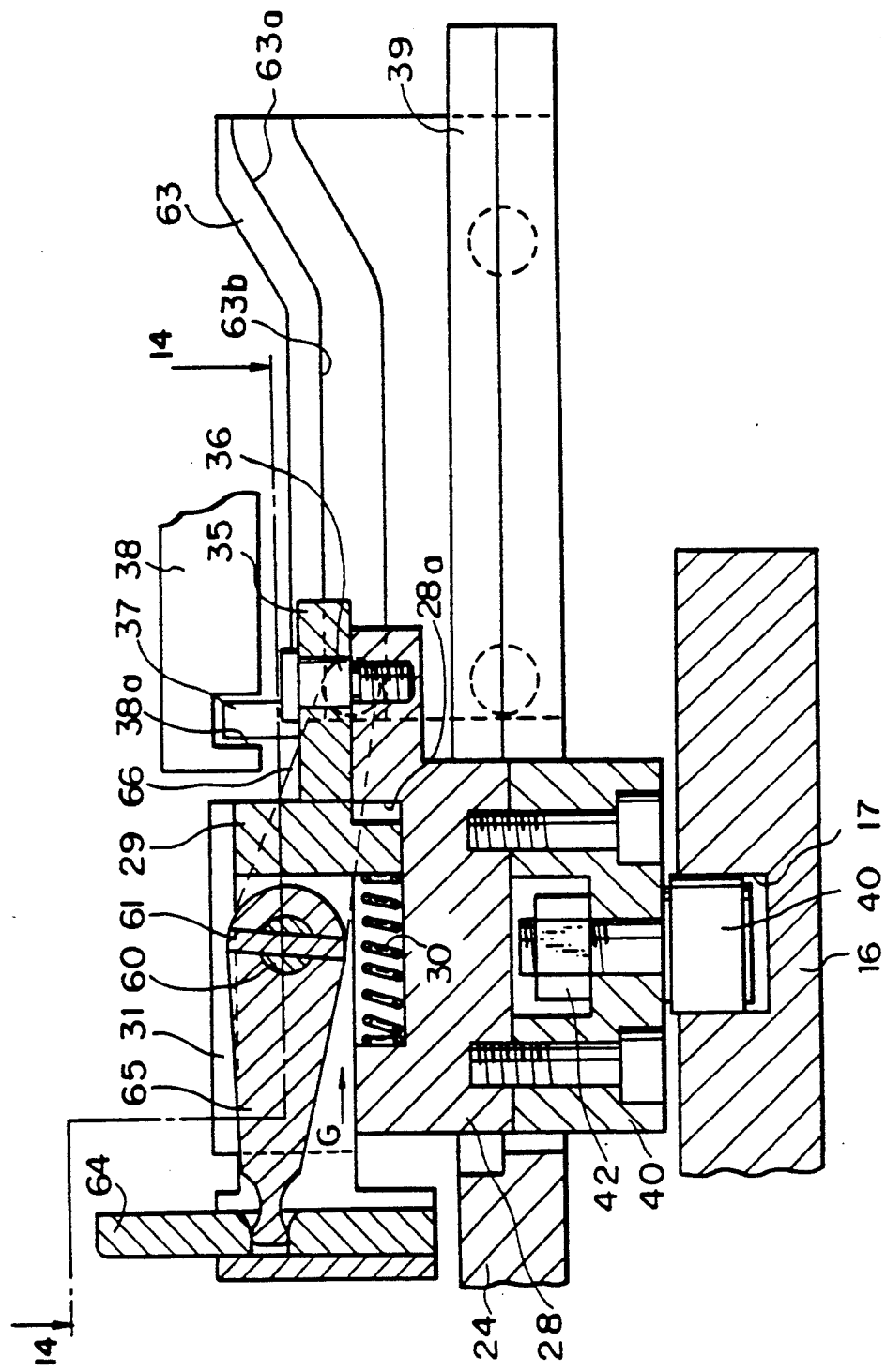
FIG. 13 is a sectional view taken along a line 13—13 of FIG. 11.
Figure 14:
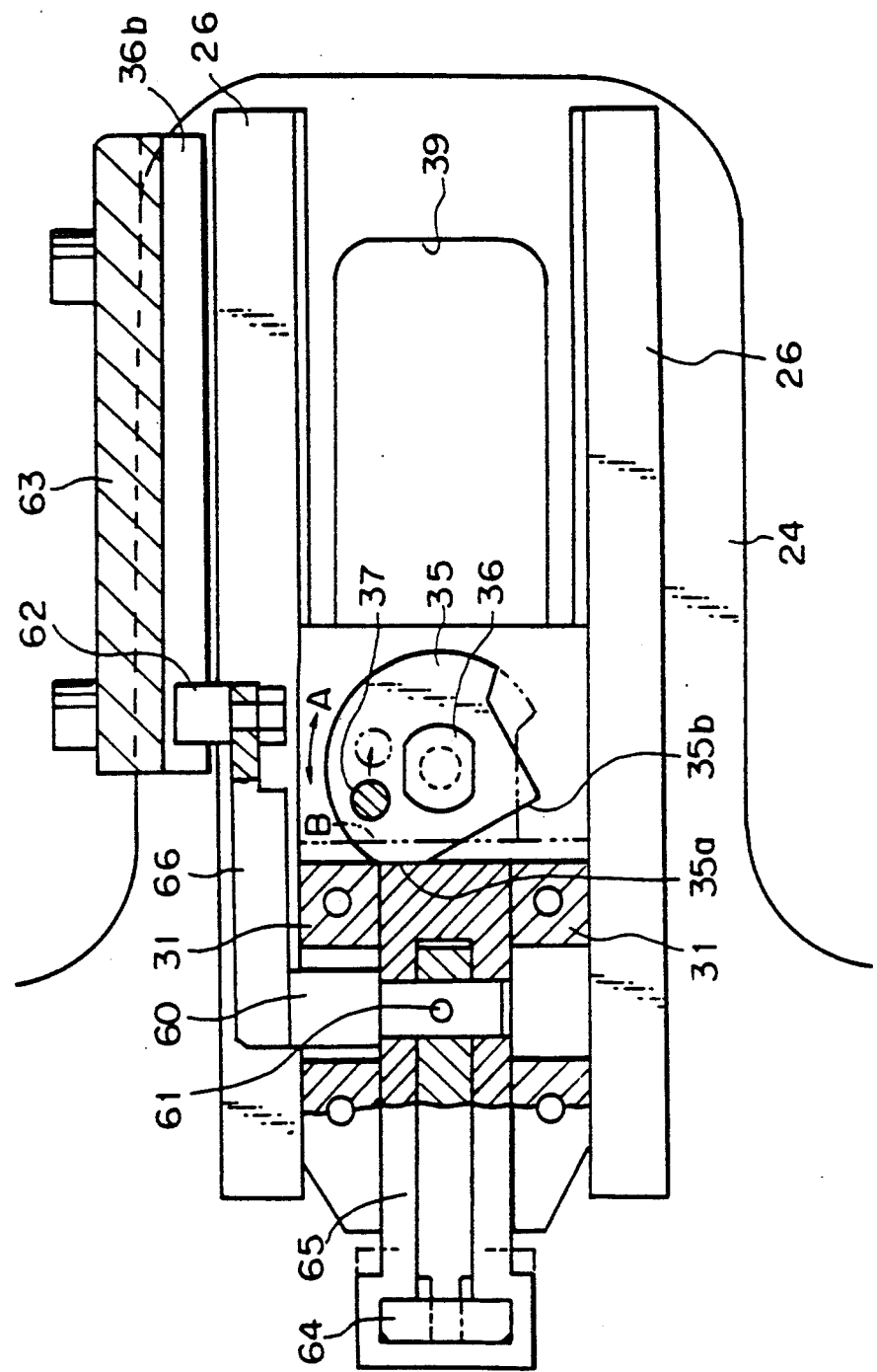
FIG. 14 is a sectional view taken along a line 14—14 of FIG. 13.

In FIG. 13, an upper face of the base 28 of each of the shaping units 25a' to 25f' has a radially extending recess 28a. The recess 28a receives the bottom of a slider 29. The slider 29 is continuously pushed radially outward by a spring 30.

A cover 31 is fixed to the top of the base 28. The cover 31 prevents the slider 29 from rising due to a load produced when the slider 29 moves along the rails 26.

A rotary shaft 60 is rotatably supported in the slider 29. A lever 65 is attached to the shaft 60 through a knock pin 61 such that the shaft 60 and lever 65 turn together. A shaping piece 64 serving as the shaping element for pressing and shaping a conductor 34 is connected to a front end of the lever 65. The shaping piece 64 is held in the slider 29 such that the shaping piece 64 is vertically slidable in parallel with the rotary shaft of the rotary table 24 at a location nearest to the rotary shaft of the rotary table 24. The sliding movement of the shaping piece 64 is carried out according to a reciprocation corresponding to one of the shaping units 25a' to 25f'.

As shown in FIGS. 13 and 14, an upright plate cam 63 is disposed along the groove 39 on the rotary table 24. Continuous cam grooves 63a and 63b are formed on the cam 63 to face a corresponding shaping unit 25a' to 25f'. The cam groove 63a is inclined with respect to a vertical line, and the cam groove 63b extends from the lowest part of the cam groove 63a. An operation arm 66 is fixed to an end of the rotary shaft 60, and a cam follower 62 is fixed to an opposite end of the operation arm 66. The cam follower 62 engages with the cam grooves 63a and 63b. When the corresponding shaping unit moves, the cam follower 62 is guided and moved along the cam grooves 63a and 63b, to turn the operation lever 66 and the lever 65 through the rotary shaft 60, thereby upwardly or downwardly moving the shaping piece 64. When the corresponding shaping unit moves radially and inwardly on the rotary table 24, the shaping piece 64 protrudes upwardly from the slider 29, and when the corresponding shaping unit moves radially and outwardly on the rotary table 24, the shaping piece 64 descends into the slider 29.

In FIG. 13, a cam 35 is rotatably fitted on the base 28 of each of the shaping units 25a' to 25f' with a screw pin 36. As shown in FIG. 14, the cam 35 has a first linear peripheral face 35a and a second linear peripheral face 35b. A pin 37 protrudes from the cam 35 to transmit torque. An end of a hook 38 (FIG. 13) driven by a cylinder (not shown) is positioned above the cam 35 and provided with a groove 38a for receiving the pin 37. A movement of the hook 38 is transferred to the cam 35 through the pin 37, to turn the cam 35 around the screw pin 36.

As shown in FIG. 14, a force G (FIG. 13) of the spring 30 continuously pushes the slider 29 against the first peripheral face 35a of the cam 35. When the cam 35 is turned so that the second peripheral face 35b, after the first peripheral face 35a, makes contact with the slider 29, the slider 29 is slightly moved radially outwardly, as indicated by an imaginary line in FIG. 14.

In FIGS. 12 and 13, a cam follower stay 40 is fixed to the bottom of the base 28 of each of the shaping units 25a' to 25f', and inserted into the groove 39 of the rotary table 24. A cam follower 41 is fixed to the cam follower stay 40 with a nut 42. The cam follower 41 engages with the groove 17 of the fixed cam 16, and when the rotary table 24 is turned by the motor 21 in FIG. 1, the cam follower 41 is guided along the groove 17 of the fixed cam 16, to thereby radially reciprocate sequentially each of the shaping units 25a' to 25f' on the rotary table 24.

In FIG. 1, the covered cylindrical guide 43 is fixed to the upper frame 14 above the housing 15. The guide 43 rotatably supports the threaded shaft 44. The pulley 46 is fitted to the upper end of the threaded shaft 44, so that the torque of the motor 47 fixed to the upper frame 14 is transmitted to the threaded shaft 44 through the pulley 48, belt 49, and pulley 46.

The left-hand male thread is formed on the lower periphery of the threaded shaft 44, and engaged with the left-hand female thread of the threaded flange 51 fixed to the plate 50. When the threaded shaft 44 is turned by the motor 47, the plate 50 and threaded flange 51 upwardly or downwardly move. The cylindrical flange 52 surrounding the lower half of the threaded shaft 44 is fixed to the plate 50 and slidably inserted into the guide 43.

The cylinder 53 is fixed to the upper frame 14 beside the guide 43. The cylinder 53 has the cylinder rod 53a downwardly protruding from the upper frame 14. The rotation-stop pin 54 is fixed to the lower end of the cylinder rod 53a. When the rod 53a of the cylinder 53 extends downwardly, the rotation-stop pin 54 enters the positioning hole 50a of the plate 50, thereby stopping the rotation of the plate 50. If the threaded shaft 44 is turned by the motor 47 at this moment, the plate 50 descends.

The reel table 56 is fitted under the plate 50 with poles 55, to face the rotary table 24. The positioning guide 57 is fixed to the center of the lower face of the reel table 56. On the other hand, the positioning pins 58 are fixed to the center of the rotary table 24. When the reel table 56 is lowered as shown in FIG. 11, the positioning guide 57 engages with the positioning pins 58 of the rotary table 24, to transmit torque of the rotary table 24 to the reel table 56 and plate 50 and turn the reel table 56 and rotary table 24 in synchronism.

The six reel bars 59a to 59f serving as the winding guides are fixed to the bottom of the reel table 56, as shown in FIG. 11. The reel bars 59a to 59f are arranged on a concentric circle around the center of the rotary table 24 at equal intervals of 60 degrees. The shaping units 25a' to 25f' are located at intermediate positions between the adjacent reel bars (59a and 59b, 59b and 59c, 59c and 59d, 59d and 59e, 59e and 59f, and 59f and 59a), respectively.

Next, the operation of the field coil forming apparatus having the above arrangement will be explained.

In FIG. 1, the rod 53a of the cylinder 53 is lowered to insert the rotation-stop pin 54 into the positioning hole 50a of the plate 50. The motor 47 is driven to transmit torque to the threaded shaft 44, and according to the rotation of the threaded shaft 44, the reel table 56 is lowered so that the positioning guide 57 may engage with the positioning pins 58. Thereafter, the motor 47 is stopped.

Figure 16:
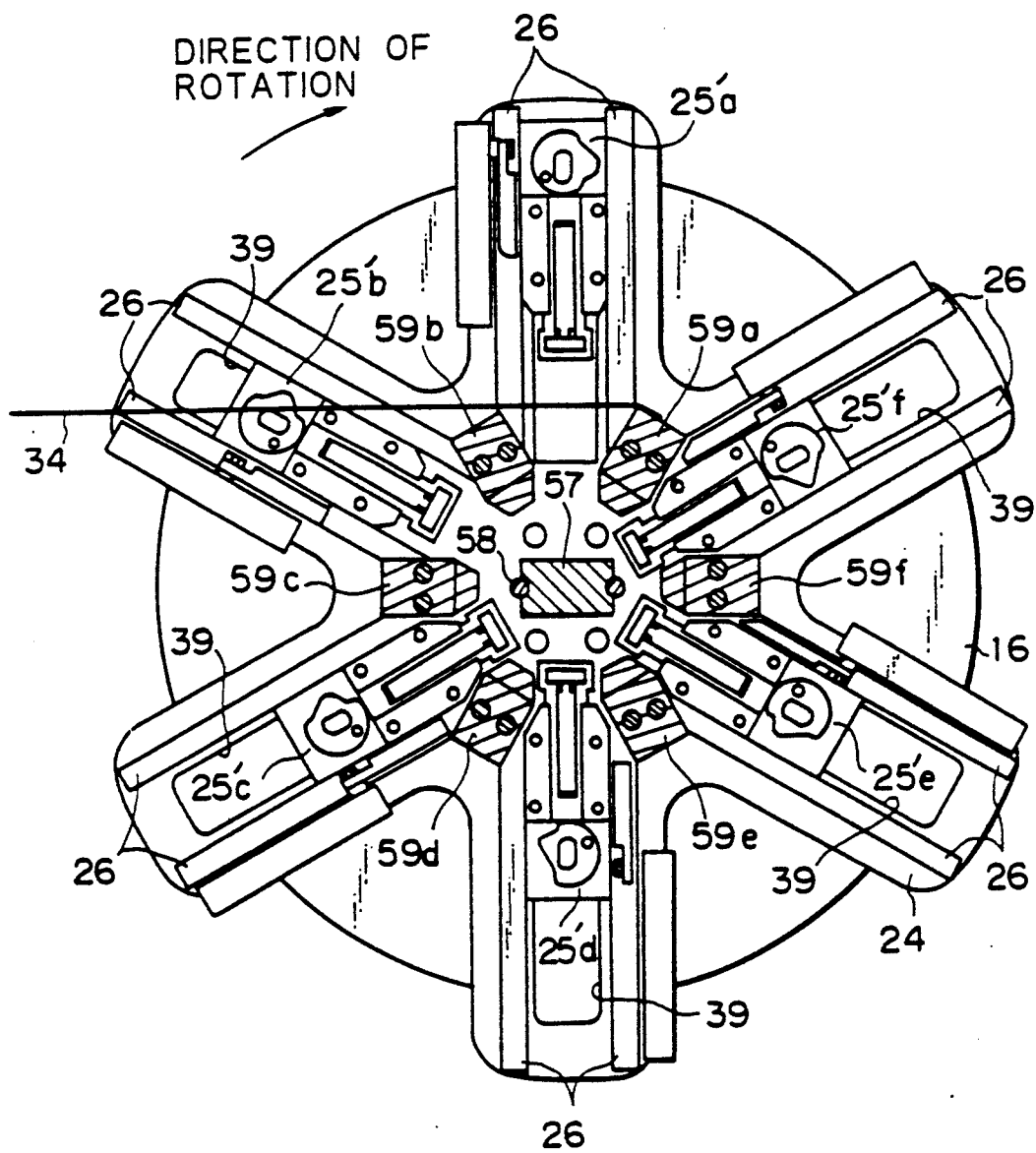
FIGS. 16 to 18 are front views explaining operations of a rotary table of the embodiment.

Next, as shown in FIG. 16, the reel bar 59a holds the conductor 34, and the cylinder 53 operates to pull the rotation-stop pin 54 out of the positioning hole 50a of the plate 50. The motor 21 is started and turns the rotary table 24 in a clockwise direction in FIG. 16, to start winding the conductor 34. At this time, the shaping unit 25a' guided by the cam follower 41 is farthest from the rotation center because it is located in the releasing zone Z3 of the cam groove 17 shown in FIG. 2.

As the rotary table 24 continues to rotate, the shaping unit 25a' of the rotary table 24 moves from the releasing zone Z3 to the shaping zone Z2 of the cam groove 17 shown in FIG. 2. The cam follower 41 fitted to the bottom of the shaping unit 25a' is guided along the cam groove 17 toward the center of the rotary table 24, to move the shaping unit 25a' toward the rotation center.

Figure 17:
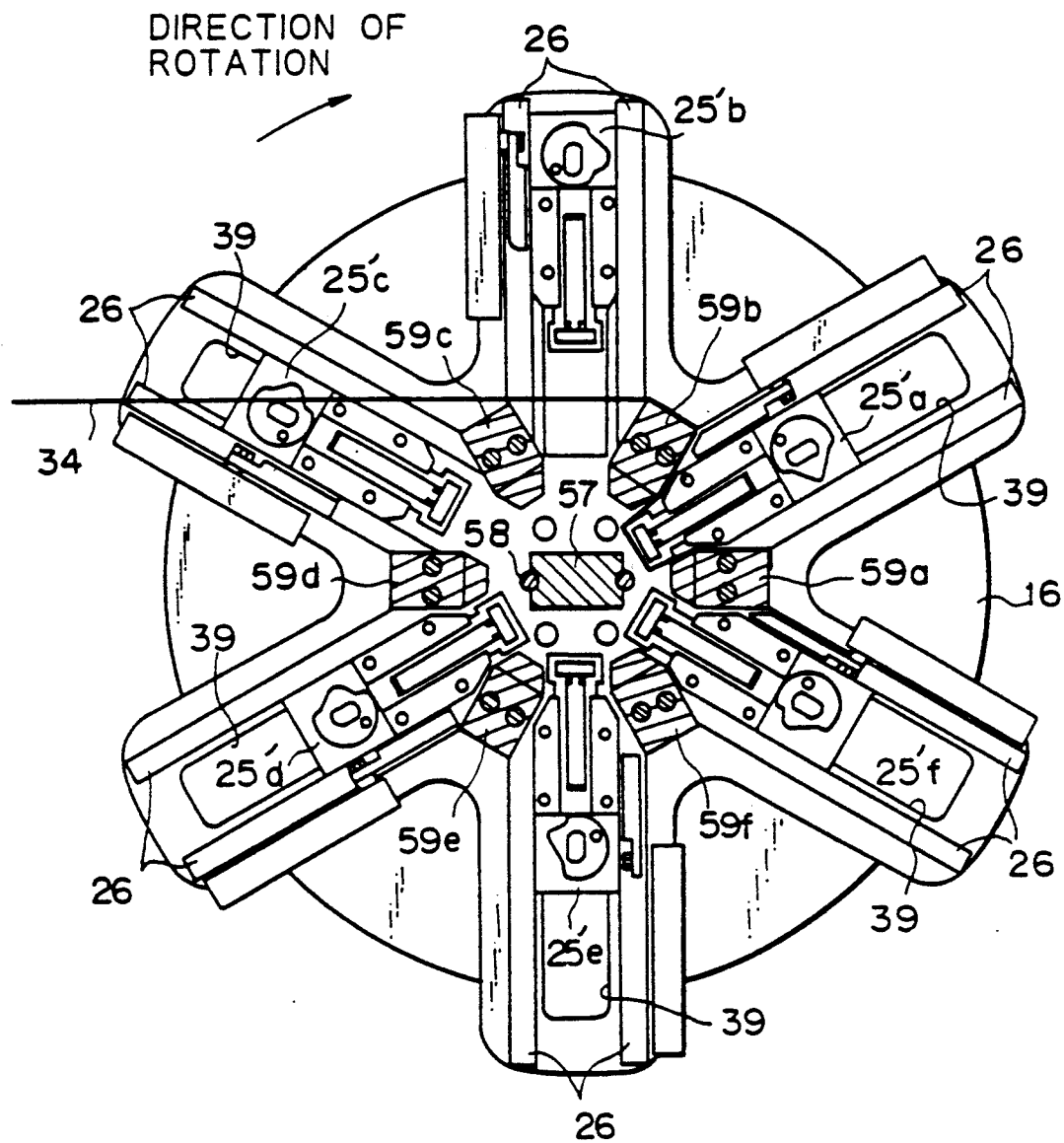

The conductor 34 is wound around the reel bars 59a and 59b due to the rotation of the rotary table 24 and is corrugated by a force exerted by the shaping unit 25a' moving toward the center of the rotary table 24, as shown in FIG. 17.

The shaping unit 25a' shaping the conductor 34 holds the corrugated shape of the conductor 34. The shaping unit 25a' on the rotary table 24 then moves into the holding zone Z1 of the cam groove 17 shown in FIG. 2. In the holding zone Z1, the cam groove 17 is equally distanced from the center of the rotary table 24, so that the shaping unit 25a' holds the conductor 34 at the minimum radius.

Figure 18:
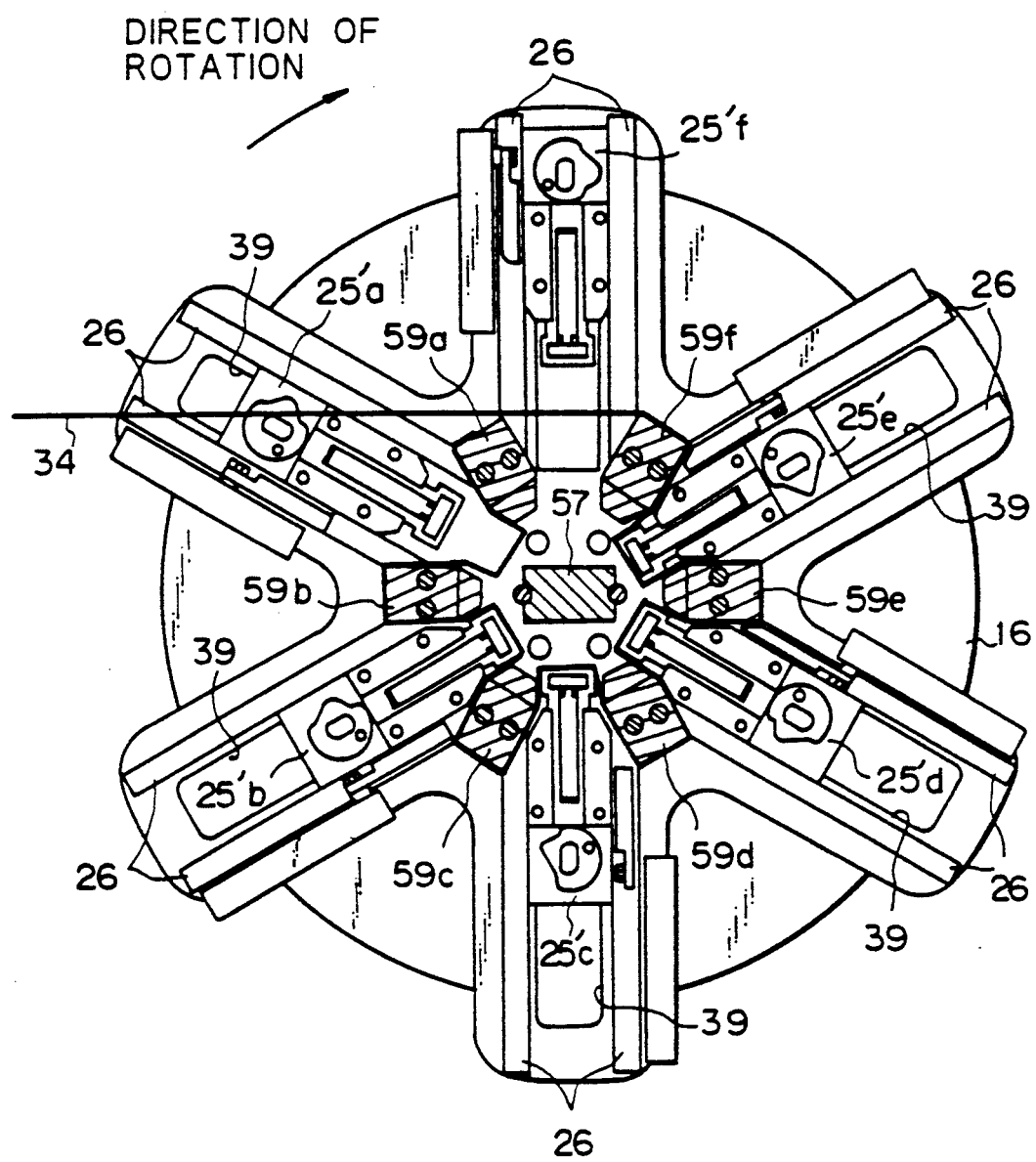
Figure 19:
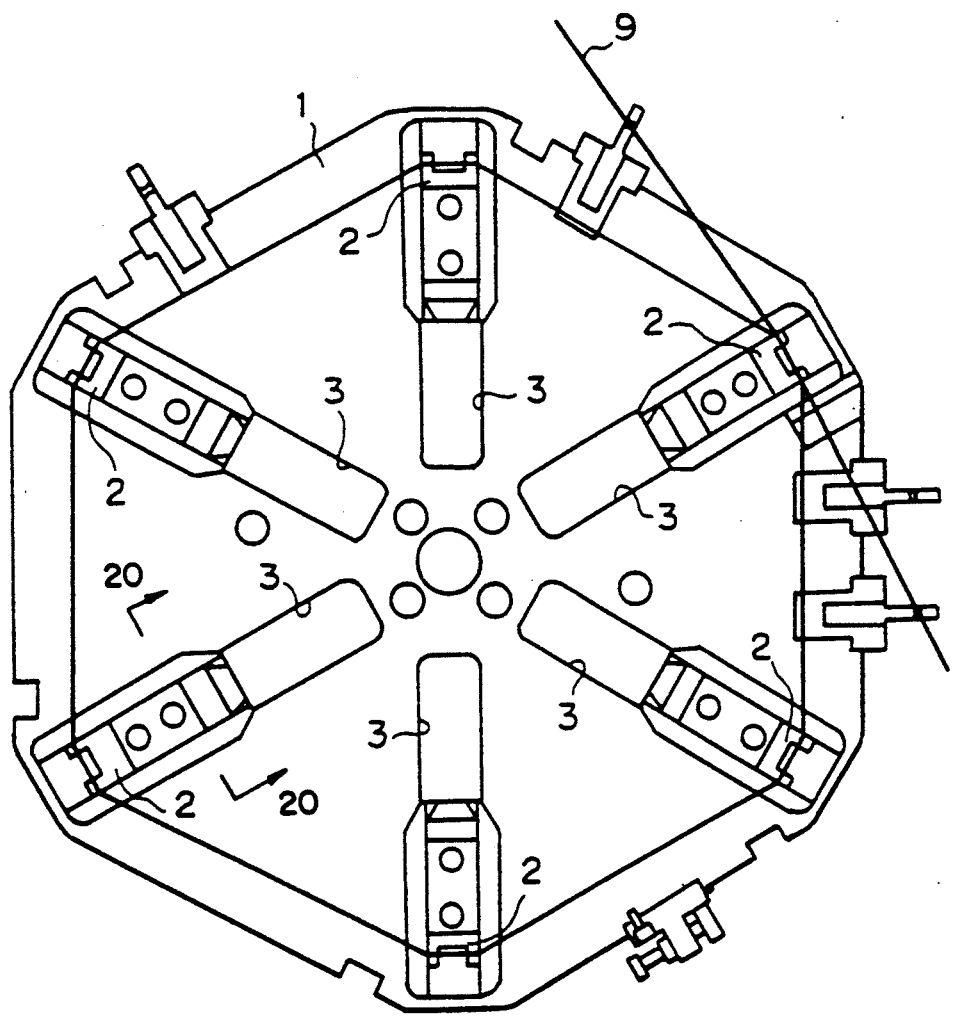
FIG. 19 is a front view showing a rotary table according to the prior art.
Figure 20:
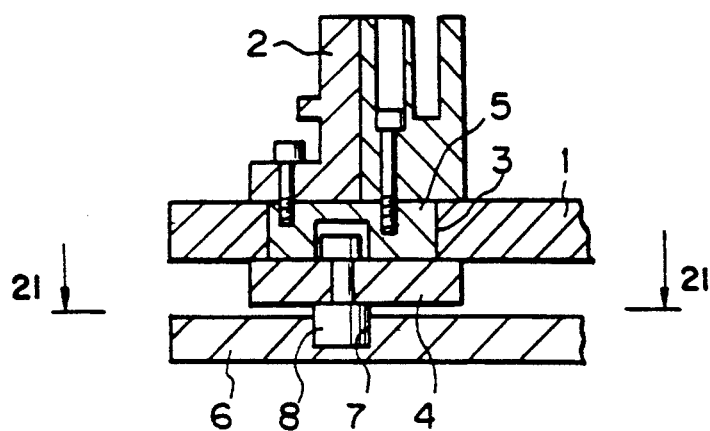
FIG. 20 is a sectional view taken along a line 20—20 of FIG. 19.
Figure 21:
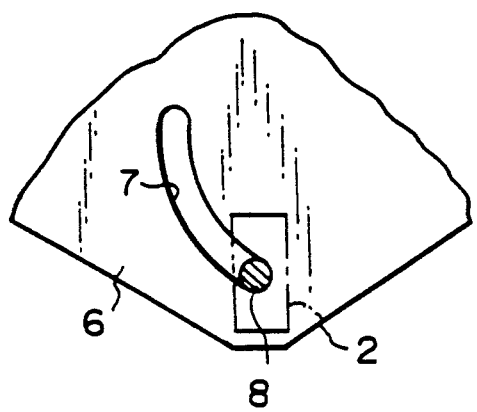
FIG. 21 is a sectional view taken along a line 21—21 of FIG. 20.
Figure 22:
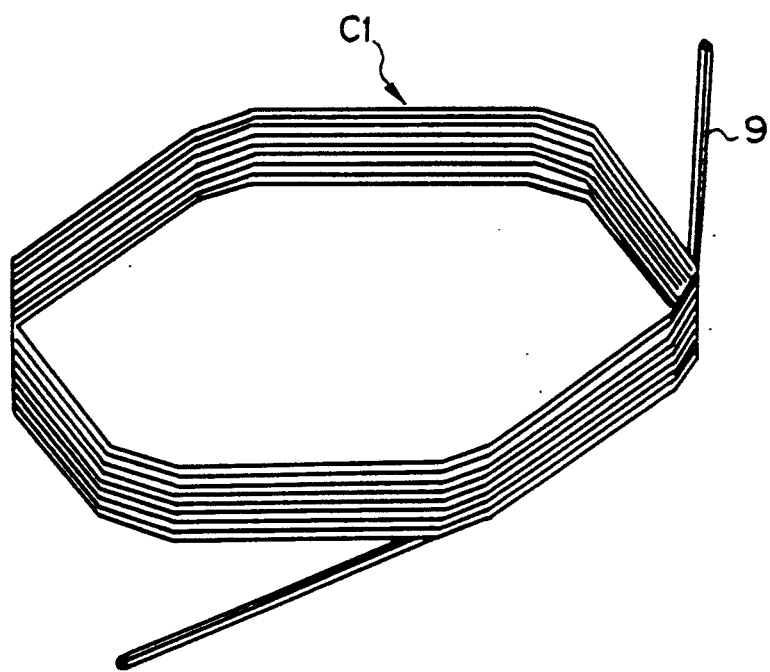
FIG. 22 is a perspective view showing a wound field coil.
Figure 23:
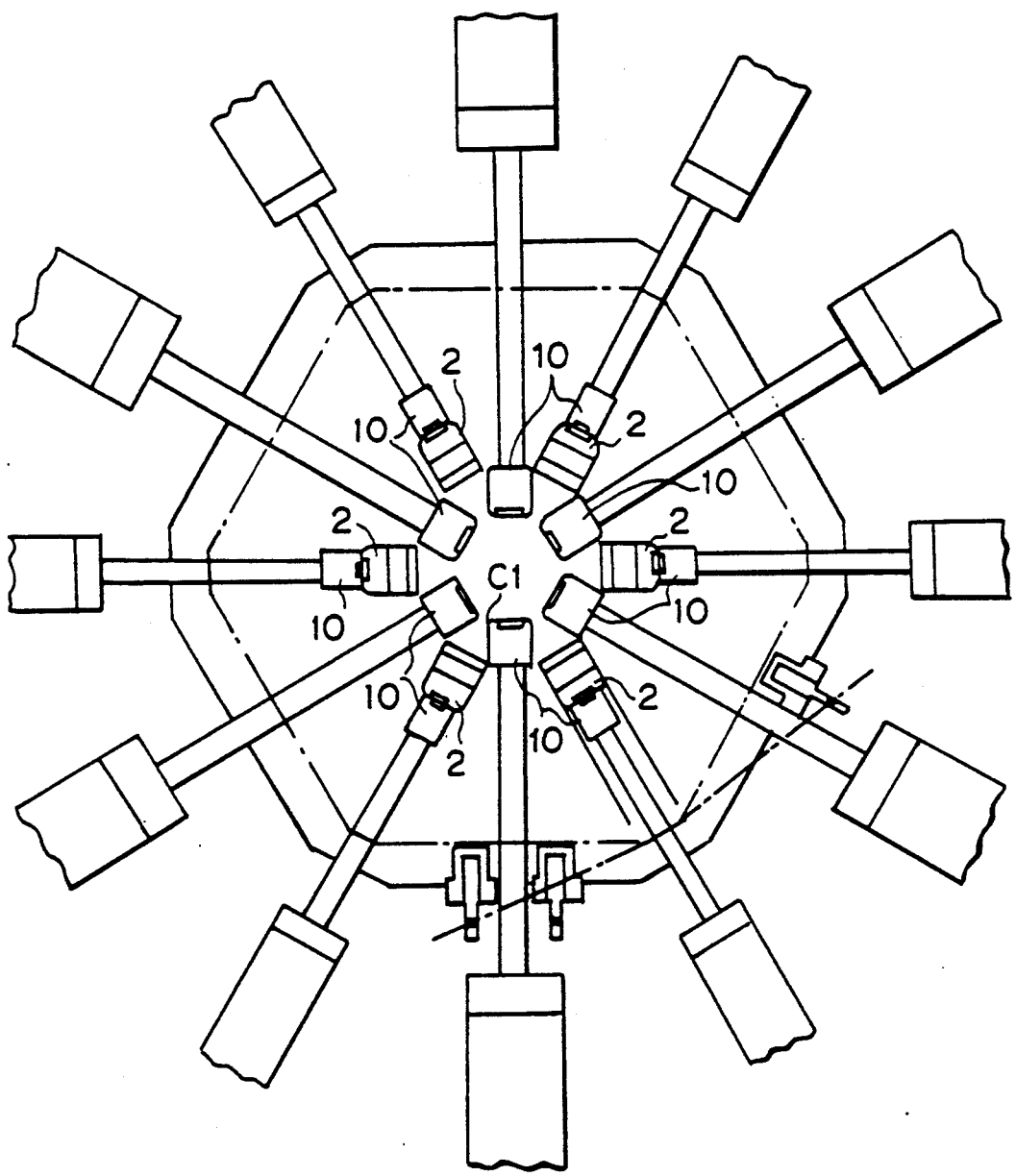
FIG. 23 is a front view showing the rotary table in forming operation according to the prior art.

When the rotary table 24 further turns, the shaping unit 25a' on the rotary table 24 moves into the returning zone Z4 shown in FIG. 2. At this time, the cam follower 41 on the lower face of the shaping unit 25a' moves along the cam groove 17 toward the periphery of the rotary table 24, so that the shaping unit 25a' moves radially and outwardly to free the conductor 34, as shown in FIG. 18.

When the rotary table 24 starts a second turn, the shaping unit 25a' on the rotary table 24 returns to the releasing zone Z3 of the cam groove 17 shown in FIG. 2, i.e., the outermost position.

The reel bar 59a then winds the conductor 34 for the second time, and the second winding of the conductor 34 is shaped as in the first winding.

Figure 15:
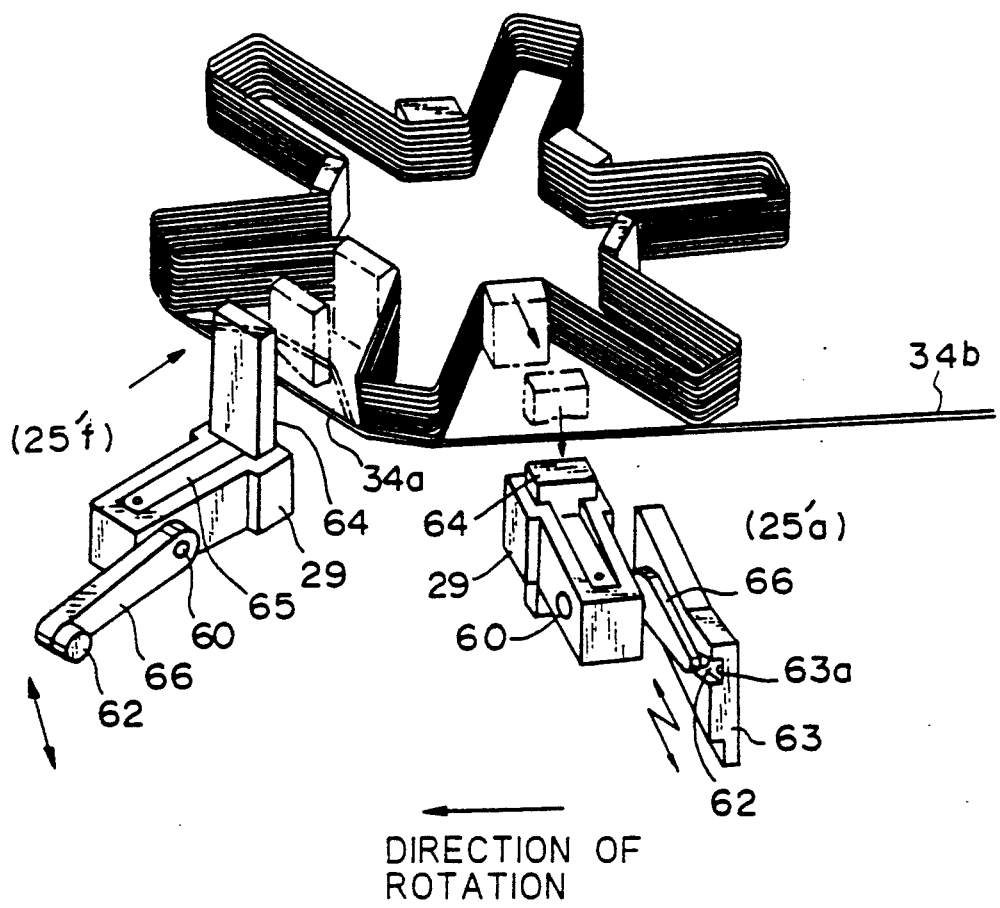
FIG. 15 is a perspective view showing a relation between shaping elements and a conductor.

A relation between the shaping piece 64 of the shaping unit 25a' and the conductor 34 in winding the conductor 34 into a coil of predetermined number of windings will be explained in detail with reference to FIG. 15.

When the slider moves radially and outwardly on the rotary table 24, the cam follower 62 is guided and moved along the cam grooves 63a and 63b of the cam 63, and the shaping piece 64 descends into the slider 29 through the actions of the operation arm 66, rotary shaft 60, and lever 65. As a result, the shaping piece 64 passes under a conductor 34b stretched or extended between a nozzle (not shown) for controlling the position of the conductor 34 and the reel bars 59a to 59f, with no interference with the conductor 34b. As a result, the conductor 34 can be continuously wound without moving the conductor by the nozzle.

Contrary to the shaping piece 64 of the shaping unit 25a', the shaping piece 64 of the leading shaping unit 25f protrudes upwardly when the slider 29 of the shaping unit 25f moves radially and inwardly on the rotary table 24, thereby shaping a stretched conductor 34a.

Similar to the shaping unit 25a' explained above, the other shaping units 25b' to 25f' alternating with the reel bars 59a to 59f form the corrugated coil in the same manner.

Since the threaded flange 51 and threaded shaft 44 are meshing with each other, the plate 50 is lifted for one pitch of the thread for one turn of the rotary table 24. The conductor 34, therefore, is wound while the reel bars 59a to 59f are being lifted.

After the predetermined number of windings of the conductor 34 is made, the hooks 38 shown in FIG. 13 are activated by the cylinder to hook the pins 37 on the cams 35 of the shaping units 25c', 25d', and 25e', thereby turning the cams 35. As a result, in each of these shaping units 25c', 25d', and 25e, the second peripheral face 35b of the cam 35 makes contact with the end face of the slider 29, and the slider 29 and thus the shaping piece 64 on the slider 29 are radially and outwardly moved by the springs 30.

Since the shaping pieces 64 of the shaping units 25c', 25d', and 25e' that hold the wound coil are outwardly moved, the coil is freed. The rod 53a of the cylinder 53 is then lowered to insert the rotation-stop pin 54 into the positioning hole 50a of the plate 50, thereby stopping the rotation of the plate 50.

Thereafter, the motor 47 is driven to turn the threaded shaft 44 and lift the plate 50, freed coil, and reel table 56.

The wound corrugated coil is removed from the reel bars 59a to 59f as shown in FIG. 24, mounted on a coil insertion jig, and inserted into a stator core as shown in FIG. 25.

In this way, according to this embodiment, the rotary table (rotary base) 24 and the reel table 56 are turned together according to the rotation of the rotary table 24, the six reel bars (winding guides) 59a to 59f guide and wind the conductor 34. The six shaping units (movable shaping members) 25a' to 25f are alternately arranged with the reel bars 59a to 59f, and supported so as to be radially movable on the rotary table 24. The groove-cam-type moving mechanism radially reciprocates, at a rate of one reciprocation per turn of the rotary table 24, the shaping units 25a' to 25f on the rotary table 24 with predetermined shifts between the movements of the shaping units 25a' to 25f, so that the conductor 34, stretched or extended between the reel bars 59a and 59f, is pushed toward the center of the rotary table 24 and shaped.

In this way, the reel bars 59a to 59f are not radially moved, and the rotary table 24 is turned to guide the cam followers 41 fitted to the bottom of the shaping units 25a' to 25f along the groove 17 of the fixed cam 16, to thereby radially move the cam followers 41 and shaping unit 25a' to 25f on the rotary table 24 and shape the conductor 34 into a coil by winding.

The reel bars 59a to 59f and the shaping units 25a' to 25f each achieve a single function to simplify the structure of the apparatus. Since the conductor 34 is formed into a coil by winding, the required coil forming load is relatively small and thus can utilize a relatively compact jig. As a result, the facilities required can be prepared in a short time, and changes in products and preparation of new products can be made in a short time at low costs.

The shaping units (movable shaping members) 25a' to 25f each have the shaping piece (shaping element) 64 for pushing and shaping the conductor 34 stretched or extended between the reel bars (winding guides) 59a to 59f toward the center of the rotary table (rotary base) 24. The shaping piece 64 is movable between the position for pushing the stretched conductor 34 toward the center of the rotary table 24 and the position not interfering with the conductor 34. Namely, the shaping piece 64 pushes the conductor 34 toward the center of the rotary table 24 and returns to an original position while being at the non-interfering position with respect to the conductor 34. In this way, when not pushing the conductor, the shaping piece 64 avoids the conductor 34 stretched between the reel bars 59a to 59f. As a result, the conductor 34 is not required to move to avoid the shaping pieces 64, and therefore, is wound at high speed with no twists.

Since the cam mechanism moves the shaping pieces 64 in synchronism of the reciprocation of the shaping units (movable shaping members) 25a' to 25f, they preferably interlock with one another.

The invention is not limited to the above embodiment which employs the fixed groove cam as the driving mechanism for the shaping units. For example, the shaping units may be provided with ball screws whose shafts are turned by a motor, etc., to radially move the shaping units on the rotary table. In this way, the groove cam may be replaced with another driving mechanism.

According to the embodiment, the number of the shaping units is six, and are disposed at equal intervals of 60 degrees. The number of shaping units may be changed. Such number should be determined based on the number of poles of a desired product and arranged at intervals of equal angles.

According to the embodiment, the vertical movement of the reel table 56 is mechanically and synchronously interlocked with the rotation thereof in winding a coil. The reel table 56 may be separately moved in the vertical direction with no synchronization with the rotation.

As explained above, the invention provides a field coil forming apparatus having a simple structure and which forms a field coil in using a lighter load and less force than conventional devices.

We claim:

1. An apparatus for forming a field coil from a conductor comprising:
   a rotary base adapted to be rotatably driven for winding the conductor into the field coil;
   a plurality of winding guides rotatably coupled to the rotary base for guiding the conductor as the conductor is wound into the field coil;
   a plurality of movable shaping members alternately arranged with the winding guides and adapted to be radially movable on the rotary base; and
   a moving mechanism for radially reciprocating the movable shaping members on the rotary base at a rate of one reciprocation per revolution of the rotary base, said shaping members being operable to push the conductor between the winding guides to thereby shape the field coil.

2. An apparatus for forming a field coil from a conductor according to claim 1, wherein the movable shaping members are guided along respective grooves, each radially extending on the rotary base, and the moving mechanism includes a fixed cam, a groove formed on the fixed cam, and a cam follower protruding from each of the movable shaping members, the cam followers being rotatably coupled with said rotary base so as to be guided along the groove of the fixed cam as the rotary base rotates.

3. An apparatus for forming a field coil from a conductor according to claim 1, wherein each of the movable shaping members includes a shaping element movable between an operative position in which it engages the conductor so as to enable the shaping member to push the conductor toward a center of the rotary base and an inoperative position in which it is disengaged from the conductor so as to enable the shaping member to move away from the center of the rotary base without interfering with the conductor.

4. An apparatus for forming a field coil from a conductor according to claim 3, wherein each of the shaping elements is moved by a cam in synchronism with the reciprocation of the corresponding movable shaping member.

5. A method of forming a field coil from a conductor comprising the steps of:
   winding the conductor into the field coil about a plurality of winding guides, said winding guides being rotatably coupled to a rotatively driven rotory base so as rotate therewith;
   reciprocating each of a plurality of radially movable shaping members between a respective pair of said winding guides at a rate of one reciprocation per revolution of the rotary base; and
   pushing the conductor between the winding guides as the winding guides are rotated so as to shape the field coil.

6. A method of forming a field coil from a conductor according to claim 5, further comprising the step of:

moving a shaping element between an operative position in which it engages the conductor so as to enable the shaping member to push the conductor toward a center of the rotary base and an inoperative position in which it is disengaged from the conductor so as to enable the shaping member to move away from the center of the rotary base without interfering with the conductor.

7. A method of forming a field coil from a conductor comprising the steps of:

rotating a rotary base;

guiding a conductor about a plurality of winding guides, said winding guides being rotatably coupled to the rotary base so as to be rotated therewith; and reciprocating each of a plurality of radially movable shaping members between a respective pair of said winding guides at a rate of one reciprocation per revolution of the rotary base to push the conductor between the winding guides as the winding guides are rotated so as to shape the field coil.

8. An apparatus for forming a field coil from a conductor comprising:

a rotary base adapted to be rotatably drivable to wind the conductor into the field coil;

a plurality of winding guides rotatably coupled to the rotary base for guiding the conductor as the conductor is wound into the field coil;

a plurality of movable shaping members alternately arranged with the winding guides and adapted to be radially movable on the rotary base; and a moving mechanism for radially reciprocating the movable shaping members in sequence and at a rate of one reciprocation per revolution of the rotary base, said shaping members being operable to push the conductor between the winding guides and thereby shape the field coil.

* * * * *